United States Patent
Colson et al.

(10) Patent No.: US 6,297,413 B1
(45) Date of Patent: *Oct. 2, 2001

(54) ANTIFOAMING AGENTS

(75) Inventors: Peter Colson, Stadecken-Elsheim; Holger Weil, Mainz, both of (DE)

(73) Assignee: Shell Research Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 08/097,801

(22) Filed: Jul. 27, 1993

(30) Foreign Application Priority Data

Jul. 30, 1992 (EP) .................................................. 92113064

(51) Int. Cl.$^7$ ...................................................... B01D 19/04
(52) U.S. Cl. ................................ 585/3; 516/113; 516/115
(58) Field of Search ...................................... 252/162, 321, 252/351, 358; 585/3; 516/113, 115

(56) References Cited

U.S. PATENT DOCUMENTS

| | | | |
|---|---|---|---|
| 3,657,136 | * | 4/1972 | Lieberman et al. . |
| 4,221,600 | * | 9/1980 | Alexander ............................. 106/223 |
| 5,393,770 | * | 2/1995 | Grayson ................................ 514/383 |

FOREIGN PATENT DOCUMENTS

| | | | |
|---|---|---|---|
| 1 769 543 | * | 9/1971 | (DE) . |
| 0 498 231 A1 | * | 1/1992 | (EP) . |

* cited by examiner

*Primary Examiner*—Robert H. Harrison
(74) *Attorney, Agent, or Firm*—Charles F. Costello

(57) ABSTRACT

Paraffinic oils which comprise in the range of from 45% to 100% basis mass per mass of one or more paraffinic hydrocarbon(s) and have an average molecular weight in the range of from 100–200 are useful as antifoam agents, especially in a surfactant-containing concentrate or an adjuvant concentrate for crop protection use.

11 Claims, No Drawings

ANTIFOAMING AGENTS

FIELD OF THE INVENTION

The present invention relates to antifoaming agents, concentrates containing them and a method for their use.

BACKGROUND OF THE INVENTION

The use of surfactants has become extensive in certain industries and enables otherwise immiscible substances to be mixed successfully. When using surfactants in a water-based system, however, foaming normally occurs. In processes where surfactants are being used for their cleaning properties, e.g., in washing liquids, foaming is acceptable, but in a number of other situations excess foaming is not desired and may interfere with processing or with the end-properties of the product. The processes of papermaking, fermentation, and application of paint all utilize antifoaming agents to reduce foam problems.

Initially kerosine and fuel oils were used to reduce foaming but found to be ineffective and unsatisfactory. More recently a number of different antifoaming agents have been developed for the major processing industries. Generally, antifoaming agents have antifoam components such as silicone-based products, e.g., silicone-coated silica particles, hydrocarbon waxes, or fatty amides or esters, often with a carrier such as a hydrocarbon oil, and if necessary, an emulsifier component.

In the crop protection industry treatment formulations are often sold in concentrated forms for dilution with water by the farmer or user at the site of use. To assist dissolution of the formulation, surfactants are often incorporated into the treatment concentrates and foaming can and often does occur on mixing with water in a spray tank. A small amount of foaming is acceptable, but large scale foaming can give spraying problems. To prevent this the farmer is known to add diesel oil to destabilize the foam. This practice is undesirable as it leads to crop and other areas being sprayed with unrefined fuel oils which is unacceptable from the environmental viewpoint.

Hydrocarbon (e.g. paraffin) oils are also known as antifoaming additives for formulations of crop protection agents, e.g., from EP-A-0498231 and (East) German Patentschrift 215227. The Applicants have now found that certain specific paraffinic oils can significantly destabilize foam formed in crop protection formulations on dilution in water. Furthermore, the time taken to break the foam with these paraffinic oils is significantly shorter than that found for conventional antifoam agents and for diesel oil.

Certain paraffinic oils of the lubricant oil type, such as the oil available from Shell Petroleum Co., Ltd., under the trade name HVI 60, are known to be useful in crop protection formulations because of their adjuvant effect by which the activity of an active ingredient is enhanced, permitting the use of smaller quantities of the active ingredient to be used. EP-A-356812 discloses an adjuvant composition which comprises surfactant components and optionally a hydrocarbon component. The latter is preferably an aromatic solvent but may be a paraffinic oil or solvent, suitably a solvent-refined petroleum oil fraction composed of paraffinic and naphthenic hydrocarbons and generally having a flash point in excess of 200° C. The hydrocarbon component is believed to exert a minor biochemical effect in use but no antifoaming action is noted, indeed low-foaming surfactants are specifically required for the adjuvant composition.

It has been found by the Applicants that the paraffinic oil adjuvant HVI 60, which has a flash point in excess of 200° C., and an aromatic solvent, SHELLSOL E, have less antifoam action than diesel oil, even at high concentration.

Paraffinic hydrocarbon oils of the type found herein to be useful as antifoam agents have been used in domestic situations because of their low odor and solvent properties, for example SHELLSOL D70 is used as the inert carrier solvent for the insecticide spray SHELLTOX, and have been found to be acceptable by the regulatory authorities.

Recent crop protection formulations have been proposed which utilize surfactants as adjuvants, often in high quantities, see for example EP-A-356812 above. The paraffinic oils specified in the present invention are particularly suited for use with such crop protection formulations and especially formulations including alcohol alkoxylate surfactants which can give rise to significant foaming problems on dilution with water.

The paraffinic oils specified in the present invention may of course be utilized for any antifoaming situation where the paraffinic component fulfills any regulatory requirements and is compatible with the process followed and product prepared.

It is to be understood that the use of the term "antifoaming agent" herein includes an agent which prevents foaming from occurring or controls or removes a foam after formation.

SUMMARY OF THE INVENTION

Accordingly, the present invention provides use of a paraffinic oil which comprises 45% to 100%, preferably 50% to 100%, mass by mass of one or more paraffinic hydrocarbon(s) and has an average molecular weight in the range of from 100 to 200, preferably 140 to 170, as an antifoaming agent.

DESCRIPTION OF THE INVENTION

The term "paraffinic oil" is used herein to denote a hydrocarbon which is a paraffin or a hydrocarbon mixture having a paraffinic component, which is usually derived from petroleum sources. The hydrocarbon(s) is derived by catalytic hydrogenation of a petroleum fraction, or is obtained by distillation, for example of hydrocarbon reaction products. Generally, such paraffinic hydrocarbons are a mix of paraffin components with a minor amount (less than 0.1% m/m, preferably less than 0.03% m/m) of aromatics; naphthenic components may also be present. Suitably, the flash point of the required hydrocarbon or hydrocarbon mix is less than 100° C., and preferably is from about 35° C. to about 75° C.

The paraffinic hydrocarbon oil specified in the present invention is therefore used as a pure or substantially pure paraffin, e.g. decane, a mixture of paraffinic isomers, a mixture of paraffins or as a mixture of paraffins with minor amounts of naphthenic or aromatic hydrocarbons. The paraffinic component is present as paraffin(s) or as isoparaffin(s) and generally herein the term paraffin should be understood to include isoparaffin. Suitably, the paraffinic hydrocarbon oil contains one or more paraffins having from 9 to 14 carbon atoms, especially from 10 to 14 carbon atoms. Especially suitable paraffinic hydrocarbon oils have a density at 15° C. (ASTM D 1298) from about 0.70 kg/l to about 0.85 kg/l, especially in the range of from about 0.75 kg/l to about 0.80 kg/l.

Useful paraffinic oils are the range of paraffinic and isoparaffinic hydrocarbons are conventional and a number are available in the SHELLSOL range of hydrocarbon solvents available from Shell Chemical Co., Ltd., or the equivalent products, for example the ISOPAR product range available from Exxon. Preferred are the SHELLSOL D and SHELLSOL T hydrocarbon grades or equivalents.

The preferred SHELLSOL D grades are defined as a complex combination of hydrocarbons obtained by treating a petroleum fraction with hydrogen in the presence of a catalyst, consisting of hydrocarbons predominantly in the range $C_9$ to $C_{14}$ and boiling in the range of from approximately 155° C. to 250° C. The aromatic content is below 0.03% m/m and the flash point is not less than 38° C. Preferred forms have a characteristically low, sweet odor.

The preferred SHELLSOL T grades may be defined as a complex combination of hydrocarbons produced by distillation of the reaction products of isobutane with monoolefinic hydrocarbons, consisting of predominantly branched chain saturated hydrocarbons having carbon numbers in the range of from $C_{10}$ to $C_{12}$ and boiling in the range of approximately 167° C. to 218° C. Preferred forms have a characteristically low odor.

The specified paraffinic hydrocarbons are of particular use in combating foam caused by the addition of surfactant-containing compositions to water or an aqueous medium, and are of especial use in conjunction with crop protection formulations, e.g. as an ingredient of a formulation or by addition with the formulation ingredients when diluting in water or aqueous medium. Of course the paraffinic antifoaming agent may be added to the aqueous medium prior to the addition of the composition which will cause the foaming, but in the crop protection industry, this is unlikely to be the case. Usually the paraffinic oil in such use will be incorporated with a crop protection concentrate containing an active ingredient and a surfactant. However, the oil can, of course, give useful antifoaming effects when added to water or aqueous medium with a crop protection concentrate or added on to a foam formed on dilution in a tank. Naturally, where a surfactant adjuvant is utilized with a particular crop protection agent, the paraffinic oil specified in the present invention may form part of a separate adjuvant concentrate which is added to the water or aqueous medium separately to the active ingredient.

Therefore, the present invention also provides a surfactant-containing concentrate for dilution in water or an aqueous medium which contains a paraffinic oil as specified above and an adjuvant concentrate which contains an adjuvant and a paraffinic oil as specified above.

A surfactant-containing concentrate is suitably in liquid form and for crop protection use may be in the form of a soluble liquid, emulsifiable concentrate, emulsion concentrate or a suspension concentrate. It is a significant departure from conventional practice to include an antifoam component into such crop protection formulations.

The surfactant with which the specified paraffinic oils are suitably used as antifoaming agents are preferably alcohol alkoxylates, for example alcohol ethoxylates and/or propoxylates. Such alcohol alkoxylates are suitably derived from a $C_{9-18}$ and preferably a $C_{9-15}$ aliphatic alcohol. The alkoxylate chain suitably has at least 5 alkoxy moieties, preferably from 5 to 9 alkoxy moieties. The DOBANOL range of alcohol ethoxylates available from Shell Chemical Co., Ltd., and the GENAPOL range of alcohol ethoxylates available from Hoechst may be particularly mentioned.

Suitably, the weight ratio of alcohol alkoxylate to paraffinic oil is in the range of from about 11:1 to about 1:1. Usefully the amount of alkoxylate present in a surfactant-containing concentrate or a crop protection adjuvant concentrate of the present invention lies in the range of from about 300 g/l to about 600 g/l, especially about 400 g/l, and the paraffinic oil is present in an amount in the range of from about 50 g/l to about 300 g/l, especially about 200 g/l.

The paraffinic hydrocarbon or oil may also be added directly to the foamy aqueous dilution. A concentration of from about 100 g to about 900 g of oil per 150 liters of aqueous medium will provide suitable antifoam action with at most only a short term effect on the quality of the defoamed product.

The present invention further provides a method of removing or preventing foam caused by the dilution in water or an aqueous medium of a formulation and a surfactant component, which comprises the addition to the water or aqueous medium of a paraffinic oil as specified above, which is simultaneous or separate, preferably subsequent, to the addition of the formulation and surfactant component.

EXAMPLES

The following Examples illustrate the invention. The active ingredient used for all of the Examples was the compound 1-(4-chlorobenzyl)-3,3-dimethyl-2-hydroxy-2-(1,2,4-triazol-1-yl)-methylcyclopentane, commonly known as metconazole. Example 1 is a comparison example; Examples 2 and 3 show the use of specified paraffinic oils as antifoaming agents. In the Examples "% m/m" indicates a mass per mass percentage basis.

Example 1

The antifoam activity of a number of conventional antifoam agents and hydrocarbon oils was assessed using the following soluble liquid formulation:

| Active ingredient | 60 g. |
| DOBANOL 91-6 | 600 g. |
| amyl alcohol | to 1 L. |

The formulation was prepared conventionally by mixing the active ingredient and the DOBANOL and making the formulation up to one liter with the amyl alcohol. DOBANOL 91-6 is an alcohol ethoxylate from Shell Chemical Co., Ltd., which has $C_{9-11}$ primary alcohol moieties with an average of 6 ethoxy units per molecule.

The assessment was carried out by adding the test substance in the specified concentration to the above test formulation at the time of preparation, diluting the resulting soluble liquid formulation in water, and stirring for one minute with a magnetic stirrer at the highest available speed. The time taken for the foam to disperse completely after the stirring had been stopped, was then recorded. The results are given in Table I below.

TABLE I

| ANTIFOAM AGENT | CONCENTRATION (g/l) | TIME TO ACHIEVE FOAM BREAK |
|---|---|---|
| – | – | 21 min 10 sec |
| ANTIFOAM T | 5 | 24 min 14 sec |
| ANTIFOAM T | 10 | 23 min 22 sec |
| ANTIFOAM T | 20 | 22 min 53 sec |
| ANTIFOAM T | 30 | 17 min 18 sec |
| ANTIFOAM DN | 5 | >21 min |
| ANTIFOAM DNE | 5 | >21 min |
| ANTIFOAM FN | 1 | >21 min |

TABLE I-continued

| ANTIFOAM AGENT | CONCENTRATION (g/l) | TIME TO ACHIEVE FOAM BREAK |
|---|---|---|
| ANTIFOAM TIP | 1 | >21 min |
| ANTIFOAM KN | 1 | >21 min |
| BEVALOID 642 | 1 | >21 min |
| BAYSILONE | 0.5 | 12 min 00 sec |
| Diesel oil | 5 | 13 min 21 sec |
| SHELLSOL E | 200 | >21 min |
| HVI 60 | 200 | >21 min |

ANTIFOAM T, ANTIFOAM DN, ANTIFOAM DNE and BAYSILONE are all antifoam agents available from Bayer AG.

ANTIFOAM FN, ANTIFOAM TIP and ANTIFOAM KN are all antifoam agents available from Hoechst.

BEVALOID 642 is an antifoam agent available from Rhone-Poulenc.

SHELLSOL E is an aromatic hydrocarbon available from Shell Chemical Co., Ltd., which typically contains 83 (ASTMD 1319% v/v) aromatics, 12% m/m paraffins and 4% m/m naphthenics, and has a density at 15° C. of 0.856 kg/l (ASTM D 1298), an average molecular weight of 125, and a flash point (ABEL) of 42° C. It distills between 164° C. and 188° C.

HVI 60 is a paraffinic oil adjuvant available from Shell Petroleum Co., Ltd., which typically contains in the range of from 10% to 30% aromatics, and has a flash point of 204° C. by PMcc, and a specific gravity of 0.872.

The concentration of each antifoam agent used was determined in accordance with the manufacturer's recommendations. For ANTIFOAM T, no more than 30 g/l could be dissolved in the test formulation; similarly for others of the antifoam agents listed, the concentration quoted is the maximum amount that could be incorporated into the test formulation.

In addition to the above a number of other oils were tested for antifoam properties with the test formulation but were found to have no ability to break the foam formed on dilution with water: SHELL GRAVEX oil (various grades), stone-pine oil, rape oil, balsa oil and solvent naphtha. Also a number alcohols were tested and showed no antifoam action: methanol, ethanol, decanol, cyclohexanol, heptanol, octanol and benzylalcohol, amongst others.

It is considered that for a desirable antifoam agent the time for the foam to break completely should be a maximum of 5 minutes. It can be seen that none of the conventional antifoam agents nor the farmer's equivalent, diesel oil, gives an acceptably low foam break time. In addition, even at a higher concentration, neither the paraffinic oil adjuvant HVI 60 nor the aromatic hydrocarbon SHELLSOL E showed any suitable antifoam activity.

Example 2

The antifoam activity of certain paraffinic hydrocarbons was assessed by the above test method and using the following test formulations:

|  | A | B |
|---|---|---|
| Active ingredient | 60 g. | 60 g. |
| DOBANOL 91-6 | 500 g. | 400 g. |
| amyl alcohol | to 1 L. | to 1 L. |

The results are given in Table II below.

TABLE II

| Test Agent | Concentration (g/l) | Formulation | Time to Foam Break |
|---|---|---|---|
| n-decane | 200 | A | 1 min 44 sec |
| n-decane | 200 | B | 0 min 43 sec |
| SHELLSOL D70 | 200 | A | 5 min 02 sec |
| SHELLSOL D70 | 200 | B | 1 min 25 sec | n-decane is a 100% paraffin having a molecular weight of 142, a density at 20° C. of 0.73 kg/l, and a flash point of 46° C.

SHELLSOL D 70 from Shell Chemical Co., Ltd., is a combination of paraffinic hydrocarbons, which typically contains in the range of from 49% to 60% m/m $C_{11-14}$ paraffins, in the range of from 40% to 51% m/m naphthenics, less than 5% m/m benzene and 0.03% m/m aromatics, and has a density (ASTM D 1298) at 15° C. of 0.792 kg/l, an average molecular weight of 174, a flash point (ABEL) of 73° C. (ASTM D 93 PMcc), and a boiling range of from 190° C. to 250° C.

It can be seen that the paraffinic hydrocarbons act very quickly to break the foam formed on dilution and mixing with water.

Example 3

The antifoam activity of a number of paraffinic hydrocarbons was assessed using a number of metconazole/DOBANOL 91-6/amyl alcohol soluble liquid formulations using the following test method.

Water (150 mls) was added at room temperature to a 250 ml graduated measuring cylinder fitted with a stopper. To this was added the test formulation. The cylinder and contents were then inverted through 180 degrees and back again once every 2 seconds for a total of thirty times, and then allowed to stand. The foam volume (in ml) on the surface of the dilution was recorded initially and again at set time intervals thereafter.

The formulations used in the tests and the test results are given in the following Tables III and IV in which:

n-Decane and SHELLSOL D70 were as in Example 2 above.

SHELLSOL D60 from Shell Chemical Co., Ltd., is a combination of paraffinic hydrocarbons, which typically contains in the range of from 46% to 55% m/m $C_{10-12}$ paraffins, in the range of from 45% to 54% m/m naphthenics, less than 5% m/m benzene and 0.02% m/m aromatics, and has a density at 15° C. (ASTM D 1298) of 0.786 kg/l, a flash point (ABEL) of 66 (ASTM D 93 PMcc), an average molecular weight of 154, and a boiling range of from 178° C. to 212° C.

SHELLSOL D40 from Shell Chemical Co., Ltd., is a combination of paraffinic hydrocarbons, which typically contains in the range of from 50% to 60% m/m $C_{9-11}$ paraffins, in the range of from 40% to 50% m/m naphthenics, less than 5% m/m benzene and 0.02% m/m aromatics, and has a density at 15° C. (ASTM D 1298) of 0.765 kg/l, a flash point (ABEL) of 40, an average molecular weight of 141, and a boiling range of from 155° C. to 202° C.

SHELLSOL TD is an isoparaffinic hydrocarbon from Shell Chemical Co. which typically contains greater than 99% m/m $C_{10-11}$ paraffins, 0% m/m naphthenics, and 0.01% m/m aromatics, and has a density at 15° C. (ASTM D 1298) of 0.751 kg/l, a flash point (ABEL) of 44, an average molecular weight of 164, and a boiling range of from 167° C. to 195° C.

SHELLSOL T is an isoparaffinic hydrocarbon from Shell Chemical Co. which typically contains greater than 99% m/m $C_{11\text{-}12}$ paraffins, 0% m/m naphthenics, and 0.01% m/m aromatics, and has a density at 15° C. (ASTM D 1298) of 0.761 kg/l, a flash point (ABEL) of 60 (DIN EN 57), an average molecular weight of 169, and a boiling range of from 179° C. to 218° C.

The test formulations used were as follows:

|  | C | D |
|---|---|---|
| Active ingredient | 60 g. | 60 g. |
| DOBANOL 91-6 | 400 g. | 450 g. |
| paraffinic hydrocarbon | 200 g. | 200 g. |
| amyl alcohol | to 1 L. | to 1 L. |

From the results it can be seen that in virtually all cases the foam is substantially broken after a minute with residual foam being lost after 3 minutes for formulation C and after 12 minutes for formulation D.

TABLE III

TEST USING FORMULATION C
PARAFFINIC HYDROCARBON

| Time | Decane | D70 | D60 | D40 | TD | T |
|---|---|---|---|---|---|---|
| Initial | 110 | 120 | 110 | 110 | 120 | 120 |
| 1 min | 6 | 60 | 6 | 6 | 4 | 4 |
| 3 mins | Nil | 1 | Nil | Nil | Nil | Nil |
| 12 mins | Nil | Nil | Nil | Nil | Nil | Nil |
| 13 mins | Nil | Nil | Nil | Nil | Nil | Nil |

TABLE IV

TESTS USING FORMULATION D
PARAFFINIC HYDROCARBON

| Time | Decane | D70 | D60 | D40 | TD | T |
|---|---|---|---|---|---|---|
| Initial | 110 | 130 | 120 | 110 | 120 | 120 |
| 1 min | 6 | 18 | 10 | 6 | 6 | 6 |
| 3 mins | Trace | 5 | 3 | 4 | 4 | 4 |
| 12 mins | Nil | Trace | Trace | 1 | 1 | 1 |
| 30 mins | Nil | Nil | Nil | Trace | Trace | Trace |

What is claimed is:

1. An aqueous crop protection formulation comprising a crop protection agent, an alcohol alkoxylate and an effective antifoaming amount of a paraffinic oil, wherein the paraffinic oil must have a flash point of less than 100° C. and a density at 15° C. as measured according to ASTM D 1298 of from about 0.70 kg/l to about 0.85 kg/l.

2. The formulation according to claim 1, wherein the crop protection agent is metconazole.

3. The formulation according to claim 1, wherein the alcohol alkoxylate comprises at least 5 alkoxy moieties.

4. The formulation according to claim 3, wherein the alcohol alkoxylate is alcohol ethoxylate.

5. The formulation according to claim 1, wherein the weight ratio of the alcohol alkoxylate to the paraffinic oil is in the range of from about 11:1 to about 1:1.

6. The formulation according to claim 5, wherein the weight ratio of the alcohol alkoxylate to the paraffinic oil is about 2:1.

7. The formulation according to claim 1, wherein the alcohol alkoxylate is present in an amount of from about 300 g/l to about 600 g/l and the paraffinic oil is present in an amount of from about 50 g/l to about 300 g/l.

8. The formulation according to claim 7, wherein the alcohol alkoxylate is present in the amount of about 400 g/l and the paraffinic oil is present in the amount of about 200 g/l.

9. A method of removing or preventing foam caused by the dilution in water or an aqueous medium of a crop protection concentrate formulation containing an alcohol alkoxylate which comprises adding an effective antifoaming amount of a paraffinic oil to the water or the aqueous medium, wherein the paraffinic oil must have a flash point of less than 100° C. and a density at 15° C. as measured according to ASTM D 1298 of from about 0.70 kg/l to about 0.85 kg/l.

10. The method according to claim 9, wherein the paraffinic oil is added simultaneously or subsequently to the addition of the crop protection concentrate formulation.

11. The method according to claim 9, wherein the paraffinic oil is incorporated directly into the crop protection concentrate formulation before addition to the water or the aqueous medium.

* * * * *